INVENTOR.
SYDNEY J. ROTH
BY Frederick E. Lange
ATTORNEY

Oct. 6, 1970 S. J. ROTH 3,532,966
TIMING MARK LOCATOR
Filed June 28, 1968 2 Sheets-Sheet 2
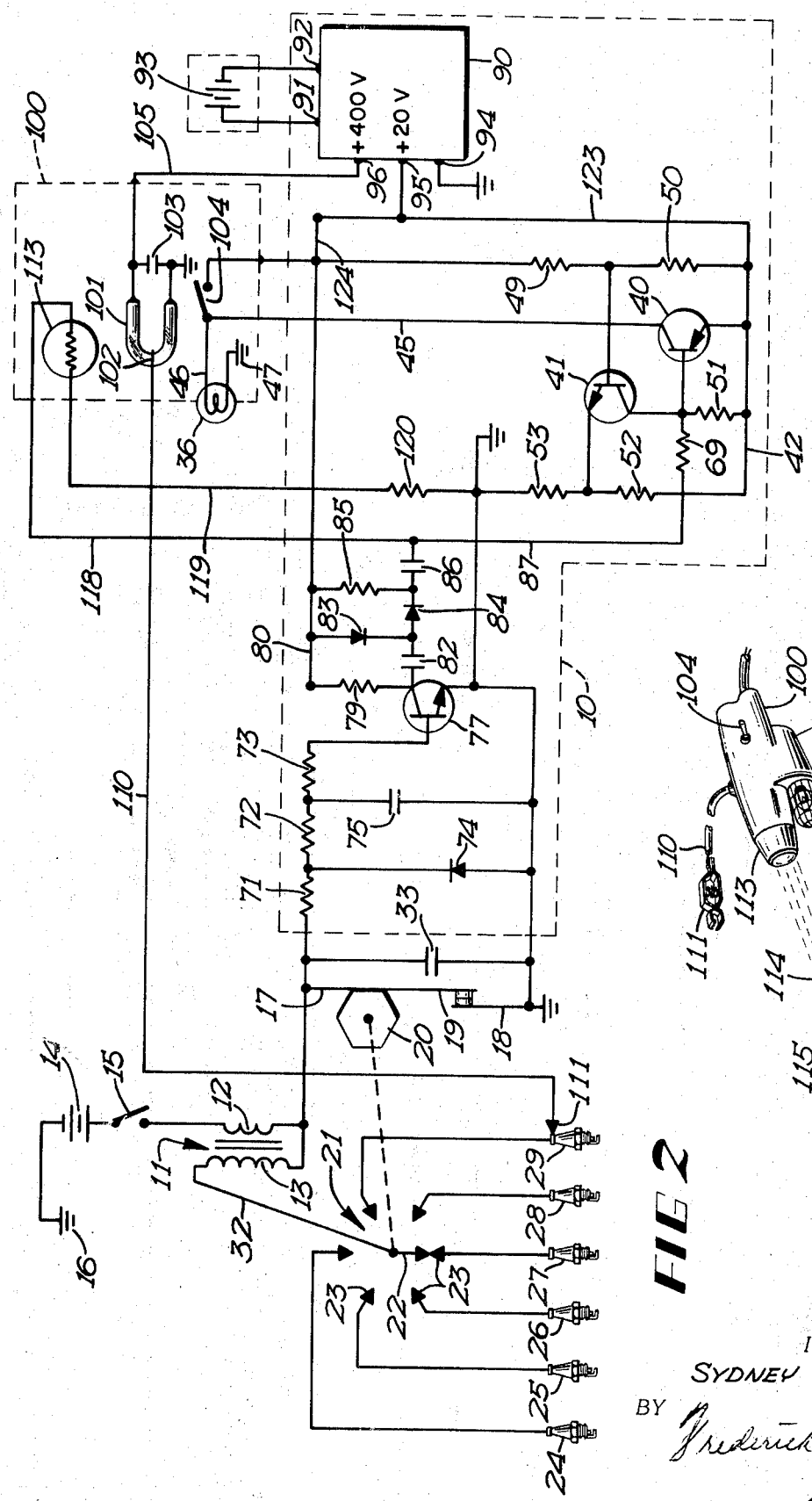
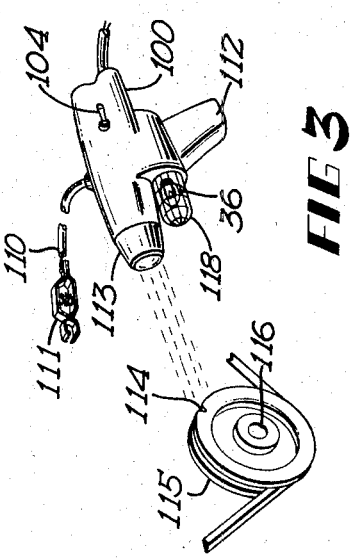
INVENTOR.
SYDNEY J. ROTH
BY Frederick E. Lange
ATTORNEY

United States Patent Office 3,532,966
Patented Oct. 6, 1970

3,532,966
TIMING MARK LOCATOR
Sydney J. Roth, Edina, Minn., assignor to Marquette Corporation, Minneapolis, Minn., a corporation of Minnesota
Filed June 28, 1968, Ser. No. 741,079
Int. Cl. G01r 13/42
U.S. Cl. 324—15                                      8 Claims

ABSTRACT OF THE DISCLOSURE

Apparatus for locating the timing mark of an internal combustion engine, while slowly advancing the engine under the control of a mechanic, in which there is an electrically operated indicating device, such as a light, responsive to a signal from the number 1 spark plug for causing the indicating device to be initially energized and means responsive to the voltage across the circuit breaker points for terminating energization of the indicating device when the points close. The apparatus may be part of a piece of diagnostic equipment designed for other functions and the indicating device in such case may be a light in the panel of the diagnostic equipment. In a modified form, the signal derived from the firing of the number 1 plug is obtained by exposing a light sensitive cell to a light which is illuminated in response to the firing of the number 1 plug, such as a timing light. In this case, the indicator light may be located in the same housing with the timing light and with the light sensitive cell. It is also contemplated that provision may be made for steadily energizing the indicating light and using the same as a "trouble light."

BACKGROUND OF THE INVENTION

In adjusting the timing of an internal combustion engine, it is common to use a stroboscopic timing light which is used to illuminate the timing mark located on a rotating part secured to the crankshaft of the engine. The timing light is flashed each time that an igniter is energized, so that the frequency of illumination of the timing light corresponds to the engine speed. In the case of a multicylinder engine employing spark plugs, the timing light is flashed as the result of the firing of a particular spark plug, usually the "number 1 plug." As a result of flashing of the timing light each time that the engine is in a predetermined position, the timing mark appears to stand still.

In order to utilize such a conventional timing light, it is first necessary to locate the timing mark. This is often covered with oil and dirt. Since the position of the timing mark is generally related to the time at which the igniter is energized, the approximate location of the timing mark can be determined if the engine is advanced until the igniter is energized. Furthermore, it is desirable that the light be on for an appreciable period of time since the engine is customarily being advanced by actuation of the starter switch and the engine speed under these conditions, while very slow compared to the running speed, is still sufficiently rapid to make it difficult to stop the engine immediately.

SUMMARY OF THE INVENTION

The present invention is concerned with an arrangement for indicating when the engine is in a position corresponding approximately to the position it occupies when an igniter is energized. It is particularly concerned with an arrangement in which there is an indicating device which is initially energized under the influence of the signal derived from the energization of an igniter such as the number 1 spark plug, and is maintained energized for a substantial period of time. More specifically, the indicating device is energized at a time related to the firing of the igniter and is deenergized at a period of time later, which period of time is related to the speed at which the engine is being rotated. Specifically, this is accomplished by deenergization of the indicating device when the "points" of an ignition switch are closed, this ignition switch being of the conventional type which is periodically opened and closed to produce high voltage impulses which are applied to the igniter.

The indicating device may take the form of an electrical lamp which is positioned in a housing adapted to be located so as to readily visible to the mechanic as the engine is advanced in position under the control of the mechanic. The signal responsive to the firing of a particular igniter may be a voltage responsive means for producing an electrical signal which varies in amplitude with whether the igniter is energized or not. On the other hand, in an alternative form, the voltage indicative of the firing of an igniter can be obtained by the use of a light which is energized when the igniter is first energized and a light energy cell exposed to the lumination from this light. This light may be a timing light of the type conventionally employed for stroboscopic observation of the timing mark. Where such a timing light is employed to illuminate a light sensitive cell, the indicating device may be an electrical lamp mounted in the housing for the timing light so as to be visible to the mechanic holding the timing light. Means may be provided for turning on this electrical lamp for steady state illumination where it is desired to use the electrical lamp as an ordinary illuminating lamp such as a "trouble light."

The energization of the indicating device may be controlled by an electronic amplifier with means responsive to the firing of the igniter connected to the input circuit of the amplifier to initiate energization of the indicating device when the igniter is energized. In such case, circuit means controlled by the ignition voltage pulse generating means may also be connected to the input circuit of the amplifier to terminate energization of the indicating device when the voltage pulse generating means has completed a portion of its cycle of operation. Where the voltage pulse generating means is a conventional circuit breaker in a distributor, the energization of the indicating device can be terminated when the points are reclosed.

Further details and objects of the invention will be apparent from a consideration of the accompanying specification, claims and drawing.

BRIEF DESCRIPTION OF THE DRAWING

FIG. 2 is a modified form of the apparatus in which the voltage responsive to the firing of the igniter is derived from a light, such as a conventional timing light, which is energized each time the igniter is fired and which illuminates a light sensitive cell; and FIG. 3 is a view of a timing light assembly including the indicating lamp of the present invention.

DESCRIPTION OF THE PREFERRED EMBODIMENTS

Figure 1:
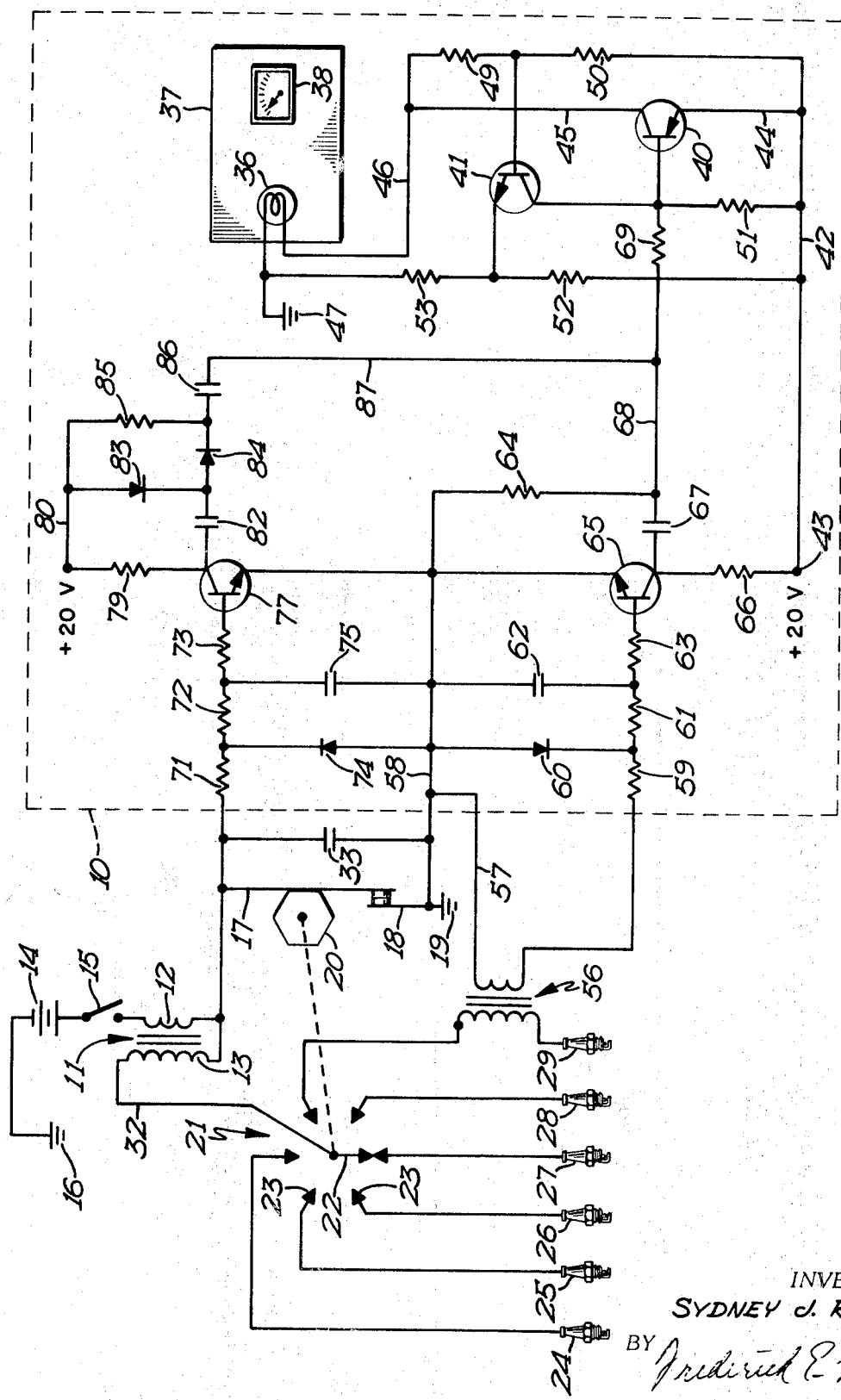
FIG. 1 of the drawing shows the apparatus in schematic form, the apparatus being shown in connection with the spark plugs and distributor points of a conventional ignition system which likewise is shown in schematic form, the indicating device being a light which is mounted on the panel of an engine analyzing device.

Referring to FIG. 1, the timing mark locating apparatus of my present invention is shown as being positioned within a housing 10 shown in dotted lines. The apparatus within the housing 10 is connected by suitable detachable connections to a conventional ignition system.

Referring first to the ignition system, the numeral 11 indicates the usual ignition coil having a low voltage primary winding 12 and a high voltage secondary winding 13, the low voltage primary winding 12 being connected to the positive terminal of the automobile battery 14 through some switch such as the conventional ignition switch 15. The opposite terminal of battery 14 is connected to ground at 16. The lower terminal of the primary winding 12 is connected to a switch blade 17 which cooperates with a second switch blade 18 to form the conventional distributor breaker points. Switch blade 18 is grounded at 19. Cooperating with switch blade 17 is a 6-sided cam 20 which serves to separate switch blades 17 and 18 six times for each revolution of cam 20. It is of course understood that if an 8 cylinder engine were being employed, the cam 20 would be 8-sided. The numeral 21 indicates a conventional distributor having a distributor arm 22 which is driven by the engine along with cam 20 and which sequentially makes electrical connection with a plurality of terminals 23, each of which is connected to a different one of the igniters 24 through 29, which igniters normally take the form of conventional spark plugs. The various igniters 24 through 29 are associated with the respective cylinders, igniter 29 being associated with cylinder No. 1, for example. While I have shown the igniters or spark plugs as located in a continuous row, it is to be understood that they are associated with cylinders in such a manner as to produce the desired firing sequence. The rotative arm 22 of the distributor 21 is connected in the conventional manner to the high tension side or upper terminal of coil 13 through a conductor 32. Upon rotation of the distributor arm 22, the voltage across coil 13 is successively applied to the various igniters or spark plugs in the desired firing sequence. Connected across the points 17 and 18 is a capacitor 33 through which the voltage from the igniter passes each time that the points 17 and 18 are open and the distributor arm 22 is connected to one of the terminals 23.

While I have shown a multi-cylinder engine in which there are a plurality of spark plugs and a distributor, it is to be understood that the device would also be applicable to an engine employing other types of igniters and spark plugs and would also be applicable to a single cylinder engine where a timing mark is employed.

Turning now to the improved timing mark locating apparatus, this comprises an electrically operated indicating device such as a light 36. The entire apparatus within FIG. 10 may be enclosed in a box including a front panel 37. The apparatus may be part of a complete engine diagnostic system comprising means for performing many functions. A meter 38 is shown as illustrative of various indicating devices that may be located on the panel.

The energization of the light or lamp 36 is controlled by a PNP transistor 40 which with an NPN transistor 41 forms part of a bi-stable driver circuit for controlling the energization of lamp 36. The emitter and collector of transistor 40 are connected in series with lamp 36 through the following circut: from conductor 42 (leading to a positive source of voltage indicated by terminal 43, which may, for example, be 20 volts) through conductor 44, the emitter and collector of transistor 40, conductors 45 and 46 and lamp 36 to ground at 47. Obviously, when transistor 40 is turned on so as to allow current to flow between the emitter and collector, current will flow through lamp 36 and cause this lamp to be illuminated. The other transistor 141 is provided to increase the conductivity of transistor 40 once it becomes conductive. The base of this transistor 41 is connected to the junction of two resistors 49 and 50, which are connected across the emitter and collector of transistor 40, in series with lamp 36. The collector of this transistor is connected through a resistor 51 to the positive conductor 42 and the emitter is connected to the junctions of two resistors 52 and 53 connected in series between the positive conductor 42 and ground connection 47. The base of transistor 40 is connected to the upper terminal of resistor 51.

Very briefly, referring to the operation of the bi-stable driver circuit comprising transistors 40 and 41, both transistors 40 and 41 are initially non-conductive, the base of transistor 40 being at a relatively high potential close to that of the emitter. At the same time, the emitter of transistor 41 is tied to a potential determined by the relative values of transistors 52 and 53, which potential is such with respect to that of the base of transistor 41 that this transistor is not conductive.

When a negative pulse is applied to the base of transistor 40, this transistor becomes conductive reducing the voltage drop across resistors 49 and 50 and raising the potential of the base of transistor 41 in a positive direction to cause this transistor to become conductive. Current flow through the emitter and collector of transistor 41 takes place through transistor 51 causing a potential drop across resistor 51 of such polarity that the upper terminal becomes substantially negative with respect to the lower terminal. This in turn shifts the potential of the base of transistor 40 in a negative direction to increase the current flow through transistor 40. Thus, once a negative force is applied to the base of transistor 40, the transistor is abruptly turned on to cause substantial energization of lamp 36.

Transistors 40 and 41 remain energized until a positive pulse is applied to the base of transistor 40. This turns off transistor 40 to cause an increase in the voltage drop across resistor 50 and hence to drive the potential of the base of transistor 41 in a negative direction, turning this transistor off also.

As will be explained subsequently, the voltage pulse resulting from the firing of the number 1 spark plug 29 is employed to produce a negative pulse which is applied to transistor 40 to turn this transistor on, and, hence, to turn on transistor 41, to cause energization of lamp 36. The signal from across the points 17 and 18, when these points reclose, is employed to apply a positive pulse to the base of transistor 40 to turn this transistor off, and, hence, to turn off transistor 41, thus terminating energization of lamp 36. Thus, the lamp 36 is energized when the spark plug 29 fires and is de-energized when the points 17 and 18 subsequently close. The means for applying these negative and positive pulses to the base of transistor 40 will now be described.

The signal indicating the firing of the spark plug 29 is derived through a transformer 56 having a low impedance primary connected into the connection between the distributor and plug 29 which, as pointed out above, is preferably the plug for the number 1 cylinder. It is to be understood that in actual practice, the transformer 56 will be incorporated into the coupling cable extending from the spark plug lead to the timing mark locating apparatus and the primary of transformer 56 will be coupled into the connection between the distributor and the spark plug by disconnecting the normal spark plug lead and inserting the primary between the spark plug lead and the spark plug.

The opposite terminals of the secondary winding 56 are connected to a square wave generating circuit, the upper terminal being connected thorugh conductor 57 to a ground conductor 58 and the lower terminal being connected to a resistor 59. Connected between ground conductor 58 and the opposite terminal of resistor 59 is a diode 60 which serves to bypass any negative components of the voltage produced by current flowing through spark plug 29. A further resistor 61, a capacitor 62, and a resistor 63 are connected in a circuit which results in the production of a relatively square wave, the positive pulses of which are initiated with the firing of the plug. This positive voltage is applied to the base of an NPN transistor 65 which has its emitter connected to ground conductor 58 and its collector connected through a resistor 66 to the positive conductor 42. The application of a positive pulse to the base of transistor 65 causes transistor 65 to become conductive and causes the upper terminal of resistor 66 to become negative with respect to the lower terminal. This negative voltage is applied through a capacitor 67, a conductor 68 and a resistor 69 to the base of transistor 40 to initiate the firing of transistor 40 as previously described. The capacitor 67, together with a resistor 64 connected between the righthand terminal of the capacitor and the emitter of transistor 65, has the function of differentiating the voltage across resistor 66 so that the negative voltage applied to the base of transistor 40 is relatively abrupt and short in duration.

The voltage derived from the voltage across the points 17 and 18 will now be described. Whenever the points 17 and 18 open, the upper terminal of capacitor 33 tends to become positive with respect to the lower terminal. Connected across the opposite terminals of capacitor 33 is a square wave generating circuit comprising resistors 71, 72 and 73, diode 74 and capacitor 75. The diode 74 serves to shunt out any negative components of the voltage existing across the points 17 and 18 due to oscillatory effects so that upon the points 17 and 18 opening only a positive voltage is applied through resistor 72 to the upper terminal of condenser 75 and through resistor 73 to the base of a further NPN transistor 77. The resistors 72 and 73 and capacitor 75 act to produce a square wave voltage, the positive pulses of which are initiated with the opening of points 17 and 18. Transistor 77 has its emitter connected to ground conductor 58 and its collector connected through a resistor 79 to a conductor 80 connected to a positive source of voltage such as 20 volts. It will be obvious that upon conduction of transistor 77, the lower terminal of resistor 79 becomes negative with respect to the upper terminal. When points 17 and 18 reclose the potential of base 77 decreases and transistor 77 ceases to conduct. Thus, the voltage across resistor 79 abruptly increases in value whenever the points open and abruptly decreases in value whenever the points close, thus resulting in a square wave voltage across resistor 79. This square wave voltage across resistor 79 is differentiated by the action of capacitor 82 to produce positive and negative voltage peaks. The negative peaks (when referenced to positive conductor 80), occurring at the time the points first open, are bypassed through a diode 83. A further diode 84 and a resistor 85 are connected across diode 83, diode 84 further acting to prevent any voltages appearing across resistor 85 which would tend to cause the lower terminal of resistor 85 to be negative. Thus, there appears across resistor 85 a series of voltage pulses, the polarity of which is such that the lower terminal of resistor 85 is positive with respect to the upper terminal. These peaks occur at substantially the time when points 17 and 18 reclose.

The positive voltage pulses existing at the lower terminal of resistor 85 are applied through a capacitor 86, a conductor 87 and resistor 69 to the base of the transistor 40. The application of such a positive pulse through the base of transistor 40 will turn off transistor 40 to extinguish the lamp 36.

Summarizing the operation of the apparatus just described, the mechanic, after attaching the leads of the apparatus across the distributor points 17 and 18 and inserting the transformer into the number 1 spark lead, advances the engine by intermittent operation of the starter switch. As soon as the number 1 spark plug fires, a negative pulse is applied to the base of transistor 40 to turn on this transistor, and, hence, to turn on transistor 41 and to energize lamp 36. This occurs at the approximate time of firing of plug 29, which is closely related to the opening of the ignition points 17 and 18. The lamp 36 remains energized until the points 17 and 18 reclose, at which time a positive pulse is applied to the base of transistor 40 to turn off the transistor. The light 36 thus remains on for a period of time, which is related to the speed at which the engine is being rotated. If the mechanic is not able to stop the engine before the light goes off, he will again advance the engine until the light reappears. If the engine is stopped while the light 36 is on, the timing mark will be in approximately the desired location. The mechanic need then removes the grease only around this location and the timing mark will be readily visible. With this apparatus it is possible to locate the timing mark with a minimum of effort.

SPECIES OF FIGS. 2 AND 3

In the species of FIGS. 2 and 3, the signal responsive to the firing of the spark plug is derived from a timing light connected to the number 1 spark plug, which timing light is employed to energize a light sensitive cell which produces a signal for initiating conduction of the transistor 40. In FIG. 2, the apparatus is shown schematically and includes a power supply which is connected to a battery to provide the necessary voltages. In order to enable a comparison of the two circuits, identical reference characters have been employed to designate corresponding elements in the two figures.

Referring first to the power supply of FIG. 2, this is shown as being within a housing 90 which has two input terminals 91 and 92 connected to a battery 93, which may be the conventional automobile battery. The battery is shown in dotted lines since it is a separate unit and is not part of the apparatus included in the inventive subject matter. The power supply has a ground terminal 94 and a low voltage output terminal 95 which may, for example, be a 20 volt terminal. The power supply also has a high voltage output terminal 96 which may, for example be a 400 volt terminal. DC voltages are obtained at both terminals. The details of the power supply are not shown since any conventional arrangement for producing higher DC voltages from a lower voltage DC source may be used.

In addition to the main timing mark locating apparatus housed within housing 10, there is an auxiliary unit 100 located within a box shown in FIG. 2 in dotted lines. The physical arrangement of this unit is shown in more detail in FIG. 3 and will be described with reference to that figure. Referring to the elements within the box 100, there is a flash tube 101 of the type commonly used in stroboscopic timing lights. Such a flash tube is normally gas filled and has two electrodes spaced at the opposite ends thereof and an intermediate trigger electrode 102. A capacitor 103 is connected across the main terminals of the flash light, this capacitor in turn being connected to the high voltage terminal 96 of the power supply and ground through conductor 105 and the ground connections, so as to be charged to a potential substantially that of the high voltage terminal 96. The tube 101 does not discharge, however, until a voltage is applied to the trigger electrode 102. The trigger electrode is connected by a conductor 110 to the terminal of spark plug 29 by any suitable detachable connector indicated by reference numeral 111. Each time that spark plug 29 fires, a high voltage pulse is transmitted through conductor 110 to the trigger electrode 102 to cause the flash tube 101 to fire. The flash tube produces a light of relatively high intensity, which is a brief duration due to the fact that the capacitor 103 quickly discharges through the tube and must be recharged before the flash tube 101 can fire again.

Disposed within the housing 101 and located so as to be exposed to the light from flash tube 101 is a light sensitive cell 113, which may be of the photo-conductive type and which has a characteristic of having its resistance lowered when illuminated. Thus, each time that the flash tube 101 fires the resistance of flash tube 113 is abruptly decreased. In this modification, the lamp 36 is also associated with the housing 100 along with the flash tube 101 and the light sensitive cell 113. Also secured within the housing 100 is a switch 114 which, as will be further explained, may be actuated to continuously energize lamp 36 when it is desired to use the unit 100 as a trouble lamp.

As indicated previously, the physical arrangement of the elements within the housing 100 is better shown in FIG. 3. It will be noted that the housing 100 is provided with a grip 112 which enables the housing to be held by the hand. The light from the flash tube 101 (not shown in FIG. 3) is directed through a tube 113. In use, the unit is held so that the light from the flash tube is directed in the general direction of the timing mark 114 located on a rotating part 115 secured to an extension 116 of the crank shaft of the engine. It will be noted that the conductor 110 extends out of the housing 100 and terminates in a clip 111 which can be secured to a suitable spark plug terminal, normally the terminal of the number 1 spark plug. The light 36 is shown as extending out of the housing 100 and surrounded by a suitable guard 118. The light must be visible outside the housing since this light is used by the mechanic to view the timing mark. Moreover when the apparatus is provided with a switch 104 to turn on the light 36 for steady state illumination, it is desirable that the light be in a position where it can be directed onto a surface to be illuminated.

It will further be noted from FIG. 3 that the switch 114 for turning on the light 36 for steady state illumination has an actuating knob projecting from the housing 100 for convenient actuation by the operator. Any suitable single pole-single throw switch may be employed.

Referring now to the operation of the apparatus of FIG. 2 as a whole, the means for deriving a pulse for the voltage across points 18 and 19 need not be described again. As with the previous apparatus, the voltage pulse derived therefrom is in the form of a positive pulse applied through conductor 87 and resistor 69 to the base of transistor 40 to turn it off when it is conductive. The apparatus including the timing light 101 and the light sensitive cell 113 is used to produce a negative pulse on the base of transistor 40 to initially cause this to become conductive. One terminal of light sensitive cell 113 is connected by conductors 118 and 87 and resistor 69 to the base of transistor 40. The other terminal of the light sensitive cell 113 is connected through a conductor 119 and a resistor 120 to ground. It will be obvious that when the light sensitive cell is not illuminated the impedance between the left hand terminal of resistor 69 connected to the base of transistor 40 and ground is relatively high so that the potential of the base 40 will not be affected by the light sensitive device 113. When, however, the light sensitive cell 113 is exposed to illumination from the flash tube 101, the impedance of this cell drops very abruptly to result in a relatively low impedance between the left hand terminal of resistor 69 and ground. This results in an abrupt shift in the potential of the base of transistor 40 in the direction of ground potential to cause transistor 40 to become conductive. As with the other modification, when transistor 40 becomes conductive, this in turn causes transistor 41 to become conductive, and this in turn further increases the conductivity of transistor 40 to cause a switching action.

It will be noted that the positive bus conductors 42 and 80 are both connected by conductors 123 and 124 to the positive terminal 95 of power supply 90, which has been illustratively shown as being at plus 20 volts. In the species of FIG. 1, the two positive bus conductors 42 and 80 were schematically shown as being connected to separate voltage sources. In actual practice, however, these bus conductors would both be connected to a single terminal of a power supply as shown in FIG. 2.

Referring now to the overall operation of FIG. 2, the connector 111 is connected to the terminal spark plug 29 and connections are made across capacitor 33 across the points 18 and 19. The mechanic now moves the engine ahead by actuating the starting switch. Since at this time, it is not important that the timing light be used to illuminate the timing mark, the mechanic is free to hold the timing light in any position and may, for example, be inside the car where he may actuate the timing switch. As soon as the engine position is reached in which the number 1 spark plug 29 fires, the voltage applied to the trigger electrode 102 causes the firing of flash tube 101 to highly illuminate the light sensitive cell 113. This in turn, as previously explained, abruptly lowers the potential of the base of transistor 40 in the direction of ground potential to cause transistor 40 to become conductive. This in turn causes transistor 41 to become conductive, which, in turn, increases the conductivity of transistor 40 to result in a switching action. The conductivity of transistor 40 results in a circuit being established from the positive bus conductor 42 through the emitter and collector of transistor 40, conductors 45 and 46 and light 36 to ground, this circuit being equivalent to the corresponding circuit in FIG. 1. The appearance of the negative pulse on the base of transistor 40 due to the firing of plug 29 occurs at substantially the same time as the points 18 and 19 are first opened. The transistors 40 and 41 remain energized to cause continued energization of lamp 36 until the points 18 and 19 reclose. At this time, as explained in connection with FIG. 1, a positive pulse is applied to the base of transistor 40. Due to the fact that the lamp 101 is illuminated for only a very short period of time, the negative voltage applied through light sensitive cell 113 will no longer be present and the positive pulse will now cause transistor 40, and hence transistor 41, to become non-conductive, to result in the deenergization of lamp 36. If the mechanic is not able to stop the engine before lamp 36 becomes de-energized, he need merely advance the engine by successive actuations of the starter switch until lamp 36 is again illuminated. When the engine is stopped with the lamp 36 illuminated, the timing mark will be in a position to be viewed. The apparatus shown in FIG. 3 can now be employed to stroboscopically illuminate the timing mark after the area around it has been cleaned to make it visible.

The advantage of the apparatus of FIGS. 2 and 3 is that a mechanic interested in using apparatus to locate a timing mark will already have a timing light. By using the apparatus of FIG. 2, it is possible to employ the same equipment as a timing light and also for producing the signal responsive to the signal of number 1 plug.

If the mechanic desires to use the unit of FIG. 3 as a trouble light, it is merely necessary for him to close the switch 114. When this is done, a direct circuit is established between the positive conductor 124, switch 114, conductor 46, lamp 36 and ground. The lamp 36 remains energized as long as switch 114 is closed so that the same unit that has been employed to locate the position of the timing mark 114 and to act as a timing light can also be employed as a trouble light to illuminate any desired part of the engine.

CONCLUSION

It will be seen that I have provided a novel form of timing mark locating apparatus which enables a mechanic to rather quickly locate the timing mark of an internal combustion engine. While I have shown the timing mark locating apparatus as forming a separate unit, it is to be understood that part of the circuitry may be employed as part of engine analyzing equipment, so that many of the electronic elements may be employed for other purposes.

I claim:

1. Apparatus for locating, while slowly advancing the engine under the control of a mechanic, the timing mark indicating the position of a crank shaft of a multiple cylinder internal combustion engine having an igniter for each cylinder and an electrical pulse generating means including an ignition switch which is periodically opened to generate a voltage pulse which is applied to said igniters in sequence, the voltage pulse applied to one of said igniters being applied when said timing mark is in approximately the desired position, said apparatus comprising:

an electrically operated indicating device,
first signal generating means for connection to said one of said igniters for generating a signal each time that said one igniter is energized as a result of a voltage pulse being applied thereto by reason of the ignition switch, means connected between said first signal generating means and said indicating device effective in response to such a signal to initiate energization of said indicating device, second signal generating means responsive to the reclosing of said ignition switch to generate a further signal, and means responsive to said further signal to terminate energization of said indicating device.

2. The apparatus of claim 1 in which said indicating device is an electrical lamp positioned in a housing adapted to be located so as to be readily visible to the mechanic as the engine is slowly advanced in position under the control of the mechanic.

3. The apparatus of claim 1 in which the first signal generating means comprises a light which is energized when the igniter is first energized and a light sensitive cell exposed to the illumination from said light.

4. The apparatus of claim 3 in which the light is a timing light of the type conventionally employed for stroboscopic observation of the timing mark.

5. The apparatus of claim 3 in which the light is a hand held timing light of the type conventionally employed for stroboscopic observation of the timing mark and in which the indicating device is an electrical lamp mounted on the housing for the timing light so as to be visible to the mechanic holding the timing light.

6. The apparatus of claim 1 in which the means connected between said first signal generating means and said indicating device includes an electronic amplifier and signal generating means and means connected to the input circuit of said amplifier to initiate energization of said indicating device when said igniter is energized.

7. The apparatus of clam 6 in which said means responsive to said further signal is connected to the input circuit of said amplifier to terminate energization of said indicating device when said pulse generating means has completed a portion of its cycle of operation.

8. The apparatus of claim 1 in which the indicating device is an electrical lamp positioned in a portable housing and in which switching means is provided for energizing said lamp continuously so that the lamp can also be used as a portable illuminating device.

References Cited

UNITED STATES PATENTS

| | | | |
|---|---|---|---|
| 2,263,859 | 11/1941 | Eldredge | 324—16 |
| 2,959,711 | 11/1960 | Parmater | 324—16 |
| 3,302,107 | 1/1967 | Flaugher | 73—116 |

RUDOLPH V. ROLINEC, Primary Examiner

M. J. LYNCH, Assistant Examiner

U.S. Cl. X.R.

324—17; 340—268